United States Patent
Beerens et al.

(10) Patent No.: US 6,772,275 B1
(45) Date of Patent: Aug. 3, 2004

(54) DEVICE AND METHOD FOR STORING TELEPHONE ENTRIES

(75) Inventors: Hans-Georg Beerens, Bocholt (DE); Alexander Hadt, Kamen (DE); Peter Paul Matthias Kisters, Krefeld (DE); Ralf Ruether, Coesfeld (DE); Peter Scholz, Bocholt (DE); Bernhard Slonina, Dortmund (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/890,843
(22) PCT Filed: Feb. 2, 2000
(86) PCT No.: PCT/DE00/00318
   § 371 (c)(1),
   (2), (4) Date: Oct. 11, 2001
(87) PCT Pub. No.: WO00/46970
   PCT Pub. Date: Aug. 10, 2000

(30) Foreign Application Priority Data

Feb. 4, 1999  (DE) .......................................... 199 04 573

(51) Int. Cl.⁷ .......................... G06F 12/06; G06F 12/12
(52) U.S. Cl. ...................... 711/103; 711/153; 711/158; 711/159
(58) Field of Search ................................. 711/103, 153, 711/158, 159, 165

(56) References Cited

FOREIGN PATENT DOCUMENTS

| DE | 43 36 791 C1 | 10/1993 |
|---|---|---|
| DE | 44 23 789 C2 | 8/1996 |
| EP | 0 540 928 A2 | 5/1993 |
| EP | 0 704 803 A1 | 4/1996 |
| EP | 0 833 251 A1 | 4/1998 |
| EP | 0 903 910 A2 | 3/1999 |
| GB | 2 297 399 | 7/1996 |
| WO | WO 80/02610 | 11/1980 |

OTHER PUBLICATIONS

Patent Abstracts of Japan—06119234—Apr. 28, 1994.

Primary Examiner—Jack A. Lane
(74) Attorney, Agent, or Firm—Bell, Boyd & Lloyd LLC

(57) ABSTRACT

A method and apparatus for storing entries in at least two separate storage areas of a non-volatile memory in a communications terminal, wherein the storage areas have fixed area boundaries, such that a dynamic redial list in the communications terminal is increased in a highly cost-effective fashion.

16 Claims, 3 Drawing Sheets

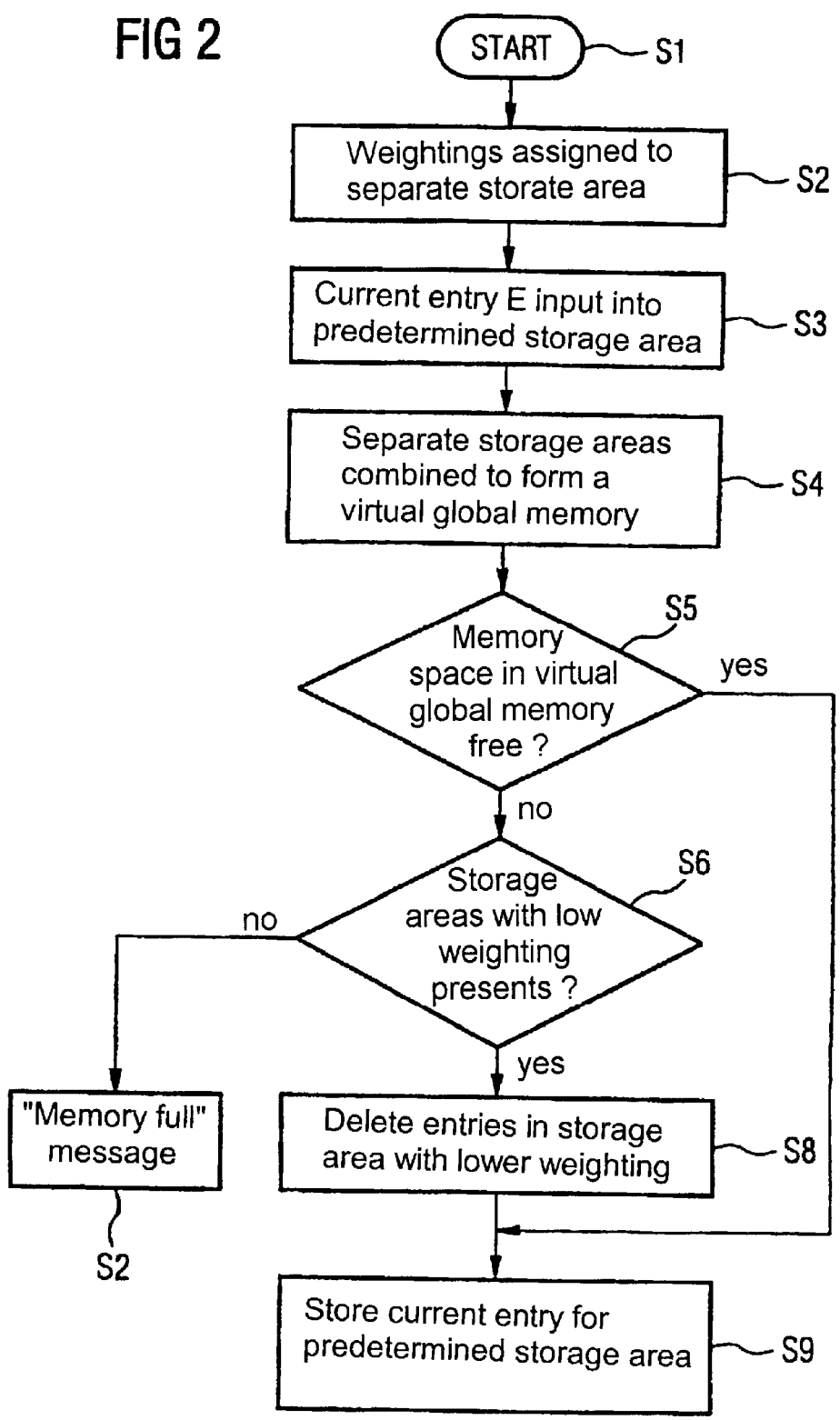

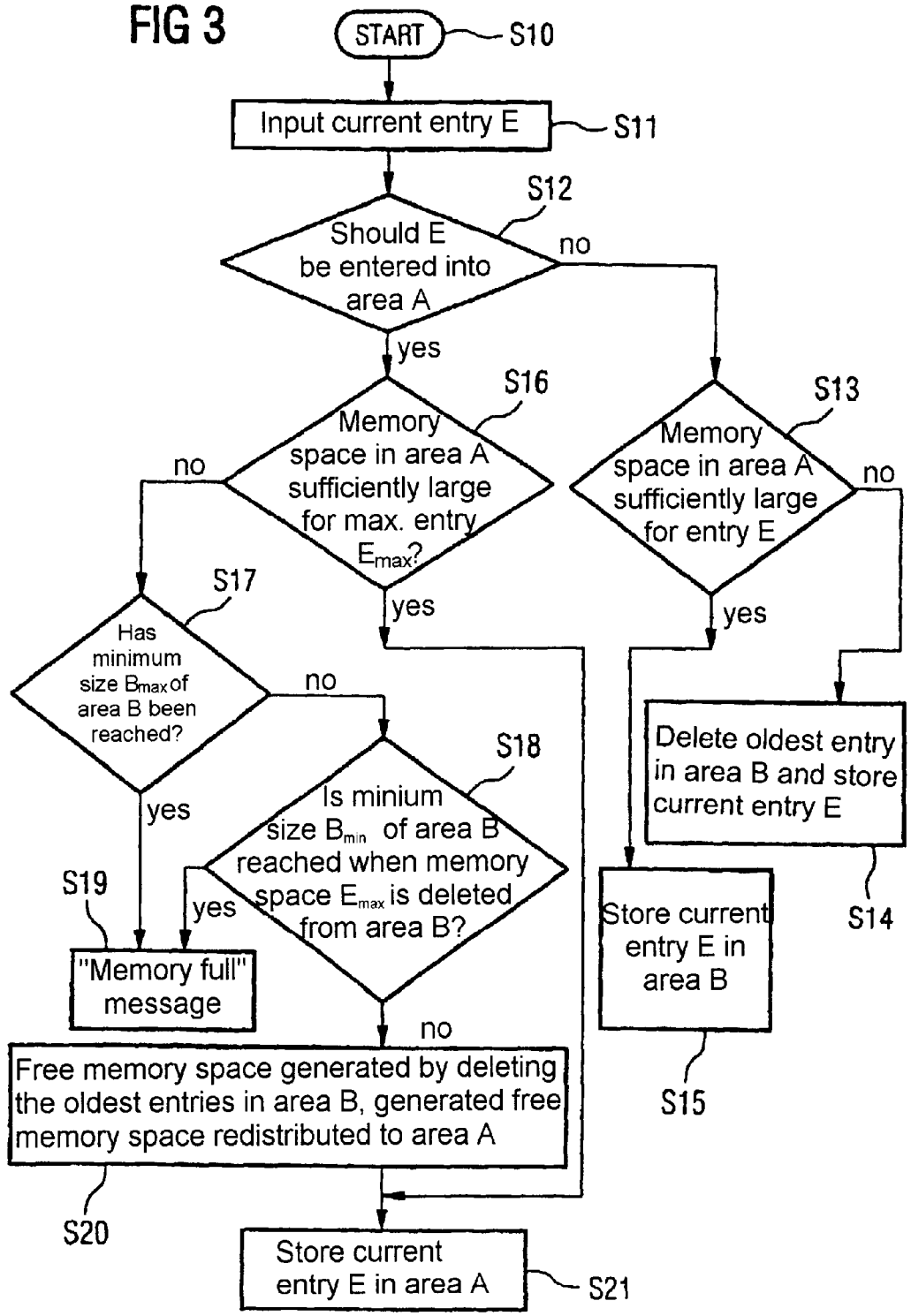

DEVICE AND METHOD FOR STORING TELEPHONE ENTRIES

BACKGROUND OF THE INVENTION

1. Field of the Invention

The present invention relates to a method and apparatus for storing entries in at least two separate storage areas of a non-volatile memory and, in particular, to a dynamic redial list in a telecommunications terminal.

2. Description of the Prior Art

Conventional telecommunications terminals such as, for example, cordless telephones or mobile phones have a non-volatile memory for storing telephone entries, but such non-volatile memory has only a limited capacity.

FIG. 4 shows a schematic view of such a non-volatile memory 1 in which, for example, a permanently predefined storage area A is provided for a telephone directory list, a permanently predefined storage area B is provided for a redial list and a permanently predefined storage area C is provided for customer-specific settings such as volume, ringing tone, warning tones, language etc. The storage area A for the telephone directory list usually has a size of approximately 100 entries (name and call number). The storage area B for the redial list is usually significantly smaller than the storage area A for the telephone directory list and has a capacity of approximately 5 to 10 entries (call numbers). The storage area C is reserved in the non-volatile memory 1 for what are referred to as customer-specific settings, and cannot be used for telephone entries.

However, such a conventional way of implementing telephone entries in a non-volatile memory 1 has the disadvantage that, in particular, the list for the redials, i.e. the storage area B, is too small. In addition, the use of a non-volatile memory with a relatively high storage capacity cannot be considered for cost reasons.

JP 06119234 discloses an arrangement for the administration of storage in which data from a central processor unit is stored in a memory, this data passing through a distinguishing unit which stores the data in a first area of the memory if the data is data which is not to be deleted, and in a second data area if it is data which is to be deleted when an update is made. If the memory space requirement of the data which is to be stored in the first area exceeds the capacity of the first area, the data which is in excess of the capacity of the first area is copied into the second area, and this part of the second area is added to the first area, while the rest of the second area is subjected to what is referred to as "garbage collection", i.e. an update is performed in which the data of the second area is deleted, after which the free area of the memory which is created is divided into a new first area and a new second area.

The present invention is, therefore, directed to providing a method and apparatus for storing telephone entries in which particularly the redial list is increased in a cost-effective fashion.

SUMMARY OF THE INVENTION

According to the present invention, by sensing free memory space in one of the separate storage areas and assigning weightings for the various storage areas it is possible to dynamically distribute the entire storage areas of the non-volatile memory, resulting in an optimum utilization of the expensive non-volatile memory.

Separate storage areas preferably contain a higher ranking telephone directory list and a lower ranking redial list. Given additional evaluation of the weightings for separate storage areas, up to 100 redial call numbers can thus be stored dynamically at the start of the redial list, its storage capacity being gradually reduced as the higher ranking telephone directory list is filled up. The storage capacity of the non-volatile memory is thus completely used from the start.

In order to prevent the redial list from being completely expelled from the memory, there is preferably the possibility of reserving a minimum size for the redial list which has an identical weighting to the telephone directory list and which, therefore, cannot be deleted.

As a result, when the telephone directory list is completely utilized, a minimum number of call numbers in the redial list is ensured.

Additional features and advantages of the present invention are described in, and will be apparent from, the following Detailed Description of the Preferred Embodiments and the Drawings.

DESCRIPTION OF THE DRAWINGS

FIG. 2 shows a flowchart representing the method steps in accordance with a first exemplary embodiment of the present invention;

FIG. 3 shows a flowchart representing the method steps according to a second exemplary embodiment of the present invention.

DETAILED DESCRIPTION OF THE PREFERRED EMBODIMENTS

Figure 1:
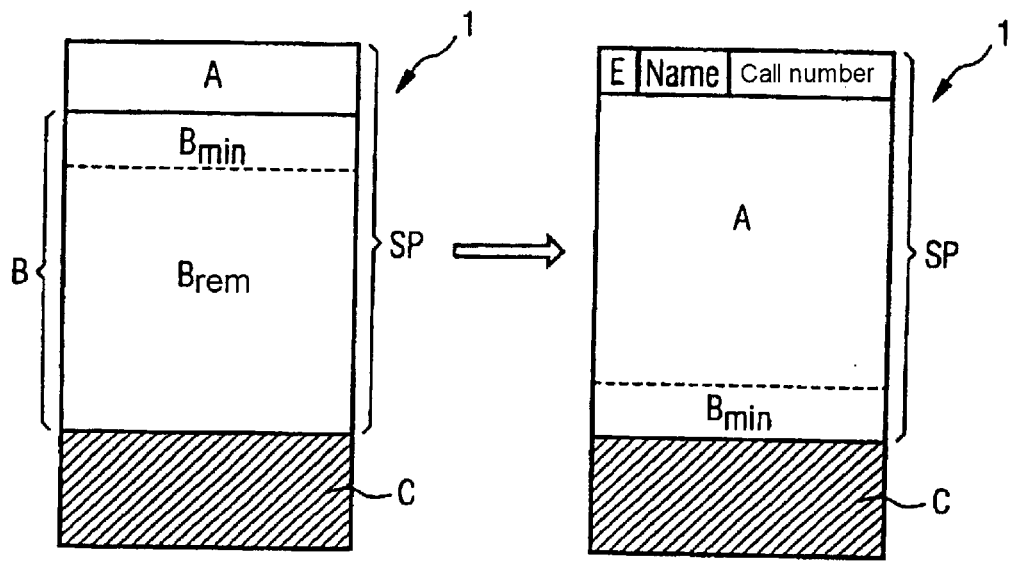
FIG. 1 shows a schematic view of a non-volatile memory before and after the storage of an entry.
Figure 4:
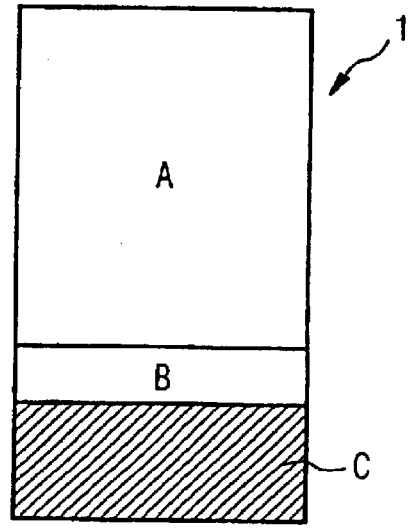
FIG. 4 shows a schematic view of a non-volatile memory with a fixed memory partition according to the prior art.

FIG. 1 shows a schematic view of a non-volatile memory 1 before and after the storage of entries in a storage area A. Identical reference symbols designate identical components to those in the non-volatile memory 1 according to FIG. 4, for which reason a detailed description is not given here. The non-volatile memory 1 according to FIG. 1 is composed, before the storage of entries in a telephone directory list, of a separate storage area A, a separate storage area $B_{min}$, a separate storage area $B_{rem}$ and a separate storage area C. The storage area C is used for storing customer-specific settings, as in the prior art according to FIG. 4. Such settings may be, for example, the volume, the ringing tone, warning tones, the language etc. of a communications terminal. The non-volatile memory 1 is composed, for example, of an EEPROM or FLASHROM, and is located in a cordless telephone or mobile phone. However, it can also be used in a wire-bound telephone or some other telecommunications terminal in which there is just a limited storage capacity for telephone entries.

The storage area A stores, for example, a telephone directory list in the form of names and associated call numbers, as in the prior art. The reference B designates a separate storage area for storing a redial list and is composed, for example, of a minimum redial list $B_{min}$ and a remaining redial list $B_{rem}$. The reference SP designates a virtual global memory which is available for storing telephone entries. The storage capacity of the virtual global memory SP is made up, according to FIG. 1, of the difference between the overall capacity of the non-volatile memory 1 and the capacity for the customer-specific settings in the storage area C.

In contrast to the prior art in which there is a fixed assignment of the storage areas A, B and C, in the present invention the virtual global memory SP is dynamically partitioned.

To be more precise, a non-volatile memory 1 has, at the start of its programming, a relatively low number of telephone directory entries in the storage area A. However, because the telephone is already intensively used, whenever a telephone call is made, call numbers are stored in the redial list B, which can use the remaining memory space of the virtual global memory SP owing to dynamic distribution. This provides the advantage that the free memory space in the telephone directory list A is not lost owing to a fixed assignment as in the prior art.

Given intensive use of the communications terminal, entries are increasingly stored in the telephone directory list A. The storage area A for the telephone directory list has here a higher weighting than the storage area B of the redial list. Owing to this fact, when a new entry E is present for the telephone directory list A, the oldest entries E in the redial list of the storage area B are automatically deleted and used as storage area A for the new telephone directory entry E. In this way, the storage area A grows, during which process there is a dynamic shifting of the partition between the storage areas A and B.

In order to avoid the storage area B for the redial list being completely expelled, part of the redial list $B_{min}$ can be assigned an identical weighting to the storage area A for the telephone directory list. In this case, a storage area B is pushed back only to a storage area $B_{min}$ of the storage area A for the telephone directory list, as a result of which a minimum number of redials in the storage area $B_{min}$ is also kept available for complete utilization of the telephone directory list. This state is represented on the right-hand side in FIG. 1 in which the non-volatile memory 1 or its virtual global memory SP is completely filled with entries E for the telephone directory list with the exception of the minimum redial list in the storage area $B_{min}$.

The method for the dynamic partitioning of the virtual global memory SP described above will be described below in detail.

FIG. 2 shows a flowchart of the method steps according to a first exemplary embodiment of the present invention.

The reference SI designates an initialization phase for the method according to the present invention. In a step S2, the predetermined weightings which indicate a certain hierarchy for the occupation or expansion of memory spaces in the non-volatile memory 1 are assigned to the separate storage areas A, $B_{min}$ and $B_{rem}$ of the non-volatile memory 1. A storage area A for a first list has, for example, a higher weighting than a storage area $B_{rem}$ for a second list.

In a step S3, a current entry E is input for a predetermined storage area. This can be, for example, an entry E for a first list, composed of name and call number, or merely a selected call number which is to be stored in the second list. In order to sense a remaining free memory space in the non-volatile memory 1, it is possible, for example in a step S4, for the separate storage areas A, $B_{min}$ and $B_{rem}$ to be combined to form a virtual global memory SP.

In an interrogation step S5, a check is made to determine whether free memory spaces are still present in the virtual global memory SP. If the result of the check in step S5 is positive, i.e. there is sufficient space for a current entry E in the virtual global memory SP, the method proceeds to a step S9. In step 9, the current entry E for the predetermined storage area is stored. To be more precise, an entry E for the first list is stored in the storage area A, while a current entry E for the second list is stored in the storage area B.

If the result of the check in step S5 is negative, i.e. there is still no space or not sufficient space free for a complete current entry E in the virtual global memory SP, the method proceeds to a step S6. In step S6, it is checked whether there are storage areas with a lower weighting than the predetermined storage area of the current entry E. In the event that the entry E for the first list is to be input, i.e. in the storage area A, the storage area $B_{rem}$ has a lower weighting than the storage area A. Accordingly, there is a storage area with a lower weighting and the method proceeds to a step S8.

In step S8, the entries in the storage area $B_{rem}$ with a lower weighting are deleted. To be more precise, in step S8 entries are deleted in the storage area $B_{rem}$ with a lower weighting until there is sufficient space for the current entry E which is to be stored. After this deletion process in step S8, the storage of the current entry E takes place, in turn, for its predetermined storage area in step S9. To be more precise, after the deletion of entries from the second list $B_{rem}$ an entry would be stored in the first list; i.e., in the storage area A. The storage area A for the first list has thus expanded dynamically in the virtual global memory SP.

If, on the other hand, it is detected in step S6 that there are no further storage areas with a lower weighting, the method ends the storage procedure in a step S7 with the message "memory full". This case occurs, for example, if the same weighting has been assigned to a storage area $B_{min}$ for a third list as to the first list A. In this case, there is no further storage area with a lower weighting, for which reason the method refuses a further entry for the first list in the storage area A with the message "memory full".

FIG. 3 shows a flowchart of the method according to the present invention in accordance with a preferred second exemplary embodiment. The second exemplary embodiment is configured in particular for the use of a telephone directory list and a redial list in a communications terminal.

In a step S10, an initialization phase for the method takes place. In a step S11, a current entry E for a predetermined storage area or a desired list is input in turn.

In an interrogation step S12, it is checked whether or not the entry E is to be entered in the storage area A for the telephone directory list. In the event that the entry E is not to be entered in the telephone directory list A, the method proceeds to a step S13 in which it is checked whether a memory space in a storage area B for a redial list is sufficiently large for the current entry E. In the event of the free memory space in the storage area B being sufficiently large for the redial list, the current entry E is subsequently stored in the storage area B in a step S15. If, on the other hand, the memory space in the storage area B is not sufficiently large for the current entry E, the oldest entry in the storage area B is deleted in a step S14 and the current entry E is stored. This deletion process or storage process corresponds here to the storage process in a stack memory which is arranged in a torus. To be more precise, the oldest entries are overwritten in each case with the current entries if the storage area B is already filled. Reading out takes place in this storage area in the reverse order, i.e. LIFO (last in first out), the last entry being read out first.

If, on the other hand, the current entry E in step S12 is a telephone directory entry, i.e. the current entry E is to be entered in the storage area A, an interrogation step S16 is then carried out.

In step S16 it is checked whether the memory space in the separate storage area A is sufficiently large for a maximum entry $E_{max}$. This ensures that the current entry E can be stored completely in the separate storage area A for the telephone directory list. If it is detected in step S16 that there is sufficient memory space available in the separate storage area A for the telephone directory list, the current entry E is then stored in a step S21 in the separate storage area A. If, on the other hand, there is not sufficient memory space present in the separate storage area A, the method is continued with a step S17 in which it is checked whether a minimum size $B_{min}$ of the separate storage area B for the redial list has already been reached. If this is the case, the method ends in a step S19 with a message "memory full". In this case, no further entry can be made in the telephone directory list because both the storage area A and the storage area $B_{min}$ are completely written to.

If, on the other hand, the result in step S17 is negative, i.e. the minimum size $B_{min}$ of the separate storage area B for the redial list has not yet been reached, a further check is carried out in a step S18. To be more precise, in step S18 it is checked whether the minimum size $B_{min}$ of the storage area B has been reached if a memory space for a maximum entry $E_{max}$ has been deleted from the separate storage area B. This interrogation ensures, in step S18, that the "memory full" message is output in step S19 even if the minimum size $B_{min}$ of the separate storage area B for the redial list has not yet been reached in step S17, but the current entry E is of such a size that a necessary deletion process of the entries in the separate storage area B would be less than the minimum size $B_{min}$. However, if the result in step S18 is negative, i.e. the minimum size $B_{min}$ of the separate storage area B is not reached even if a corresponding memory space for a maximum entry $E_{max}$ is deleted, the method proceeds to a step S20.

In step S20, the oldest entries in the separate storage area B for the redial list are deleted, as a result of which free memory space is generated. The generated free memory space is then assigned or redistributed to the separate storage area A for the telephone directory list. In the following step S21, the current entry E is then stored in the separate storage area A for the telephone directory list.

The apparatus device for implementing the method described above, i.e. for storing telephone entries in at least two separate storage areas of a non-volatile memory, is preferably composed of an input unit, which corresponds to the conventional keypad of a telephone or communications terminal. The other units, for example an assignment unit for assigning weightings, a first sensing unit for sensing free memory space and a second sensing unit for sensing storage areas with a low weighting, are preferably implemented in a central processor unit (CPU) of a communications terminal and are not described below in more detail. The non-volatile memory 1 is preferably composed of an EEPROM or FLASHROM and constitutes a permanent-storage data memory. The present invention is preferably implemented in a cordless telephone or a mobile phone because there is a particular need for telephone directory lists and redial lists in these communications terminals.

The present invention has been described above with reference to telephone directory lists and redial lists. However, it is not restricted thereto and can also administer, for example, lists for abbreviated dialing numbers. In this way, even the storage area C for customer-specific settings also may be dealt with. In addition, the method according to the present invention and the associated device can also be operated in a wire-bound telecommunications terminal, such as a video phone, or in a computer-controlled terminal.

Indeed, although the present invention has been described with reference to specific embodiments, those of skill in the art will recognize the changes may be made thereto without departing from the spirit and scope of the invention as set forth in the hereafter appended claims.

What is claimed is:

1. A method for storing entries in at least two separate storage areas of a non-volatile memory in a communications terminal, the storage areas having fixed area boundaries, the method comprising the steps of:
   assigning weightings for the separate storage areas;
   inputting a current entry for a predetermined storage area;
   checking free memory space in the predetermined storage area;
   checking storage areas with a lower weighting of the storage area of the current entry if the step of checking the free memory space is negative;
   deleting entries in the storage area with a relatively low weighting if the step of checking the storage areas with the lower weighting is positive; and
   storing the current entry for the predetermined storage area if one of the step of deleting entries has been carried out and the step of checking the free memory space is positive.

2. A method for storing entries in at least two separate storage areas of a non-volatile memory in a communications terminal as claimed in claim 1, the method further comprising the step of:
   indicating a full memory if at least one of the step of checking the storage areas with a lower weighting is negative, and a complete current entry is larger than the free memory space.

3. A method for storing entries in at least two separate storage areas of a non-volatile memory in a communications terminal as claimed in claim 1, wherein the step of checking the free memory space includes combining the separate storage areas to form a virtual global memory, and the global memory is checked for free memory space.

4. A method for storing entries in at least two separate storage areas of a non-volatile memory in a communications terminal as claimed in claim 1, wherein at least two separate storage areas include a telephone directory list and a redial list.

5. A method for storing entries in at least two separate storage areas of a non-volatile memory in a communications terminal as claimed in claim 4, wherein the telephone directory list has an equal weighting to a minimum size, and a higher weighting than a remainder of the redial list.

6. A method for storing entries in at least two separate storage areas of a non-volatile memory in a communications terminal as claimed in claim 4, wherein the storage area for the redial list includes toroidal stacked storage and main-addressed storage for the telephone directory list.

7. A method for storing entries in at least two separate storage areas of a non-volatile memory in a communications terminal as claimed in claim 6, wherein the step of deleting entries is started with an oldest entry.

8. A method for storing entries in at least two separate storage areas of a non-volatile memory in a communications terminal as claimed in claim 1, wherein a further separate storage area includes an abbreviated dialing list.

9. A method for storing entries in at least two separate storage areas of a non-volatile memory in a communications terminal as claimed in claim 1, wherein the step of deleting entries is carried out only if a current entry can be stored completely in the predetermined storage area.

10. An apparatus for storing entries in at least two separate storage areas of a non-volatile memory in a communications terminal, wherein the storage areas have fixed area boundaries, comprising:
    an assignment unit for assigning weightings for the separate storage areas;

an input unit for inputting a current entry in a predetermined storage area;

a first sensing unit for sensing free memory space in the predetermined storage area;

a second sensing unit for sensing storage areas with a lower weighting than the predetermined storage area of the current entry;

a deletion unit for deleting stored entries in the storage areas with a relatively low weighting if the second sensing unit senses storage areas with a relatively low weighting; and a storage unit for storing the current entry if one of the deletion unit has deleted a sufficient number of entries, and the first sensing unit has sensed a sufficient free amount of memory space.

11. An apparatus for storing entries in at least two separate storage areas of a non-volatile memory in a communications terminal as claimed in claim 10, further comprising:

an output unit which indicates a full memory if at least one of the second sensing unit has not sensed any separate storage areas with a relatively low weighting, and the complete current entry is larger than the free memory space sensed by the first sensing unit.

12. An apparatus for storing entries in at least two separate storage areas of a non-volatile memory in a communications terminal as claimed in claim 10, wherein the separate storage areas are at least one of a telephone directory list, a redial list, and an abbreviated dialing list.

13. An apparatus for storing entries in at least two separate storage areas of a non-volatile memory in a communications terminal as claimed in claim 12, wherein the telephone directory list has an equal weighting to a minimum size of the redial list.

14. An apparatus for storing entries in at least two separate storage areas of a non-volatile memory in a communications terminal as claimed in claim 12, wherein the redial list is implemented in a toroidal memory and the telephone directory list is implemented in an addressable name memory.

15. An apparatus for storing entries in at least two separate storage areas of a non-volatile memory in a communications terminal as claimed in claim 10, wherein in the non-volatile memory is one of an EEPROM and a FLASHROM.

16. An apparatus for storing entries in at least two separate storage areas of a non-volatile memory in a communications terminal as claimed in claim 10, wherein the communications terminal is one of a cordless telephone and a mobile phone.

* * * * *